(12) United States Patent
Carvill

(10) Patent No.: US 6,826,501 B1
(45) Date of Patent: Nov. 30, 2004

(54) METHOD AND APPARATUS FOR ESTIMATING WATER BOTTOM REFLECTION TIME DIFFERENCE

(75) Inventor: Charles V. Carvill, Katy, TX (US)

(73) Assignee: WesternGeco, L.L.C., Houston, TX (US)

(*) Notice: Subject to any disclaimer, the term of this patent is extended or adjusted under 35 U.S.C. 154(b) by 0 days.

(21) Appl. No.: 10/609,092

(22) Filed: Jun. 27, 2003

(51) Int. Cl.$^7$ .......................... G01V 1/00; G06F 15/00
(52) U.S. Cl. .......................... 702/100; 702/14; 702/16; 702/18; 367/50; 367/21
(58) Field of Search .......................... 702/100, 85, 13, 702/14, 16; 367/50, 54, 902, 24; 703/10

(56) References Cited

U.S. PATENT DOCUMENTS 4,992,993 A * 2/1991 Chambers .................... 367/21
5,583,825 A * 12/1996 Carrazzone et al. .......... 367/31

OTHER PUBLICATIONS

Levin, F.K., *Aparent Velocities from Dipping Interface Reflections*, pp. 510–516, issue 3, v. 36 Geophysics (1971).
Wombell, Richard, *Water Velocity Variations in 3–D Seismic Processing*, 66$^{th}$ Annual International Meeting: Soc. of Expl. Geophys., pp. 1666–1669 (1996).
Wombell, Richard, *Water Velocity Variations and Static Corrections in 3–D Data Processing*, 59$^{th}$ Annual Meeting: Europe Association Geosci. Eng., Session: A029 (1997).
Fried, Jonathan and MacKay, Scott, *Dynamic Corrections of Water Velocity Variations*, Canadian Society of Exploration Geophysicists Recorder (Oct., 2001).
McKay, Scott *Dynamic Water Velocity Correction*, WesternGeco Patent Memo, dated Apr. 6, 2001, Application No. 09/981,226, Filed Oct. 17, 2001.

* cited by examiner

*Primary Examiner*—Kamini Shah
(74) *Attorney, Agent, or Firm*—Jeffrey E. Griffin; WesternGeco, L.L.C.

(57) ABSTRACT

The present invention provides a method for reducing water bottom reflection time differences. The method includes selecting a plurality of trace groups, each trace having an offset from a midpoint and a water bottom reflection time. The method also includes determining a rate of change of the water bottom reflection time of each trace and generating a model water velocity and a model water bottom reflection time for each trace midpoint using a preselected function of the water bottom reflection times and the rates of change. Furthermore, the method includes generating a plurality of water bottom reflection time corrections for the traces in each trace group using a pre-selected function of the water bottom reflection times, the model water bottom reflection times, the model water velocities, and the trace offsets.

30 Claims, 7 Drawing Sheets

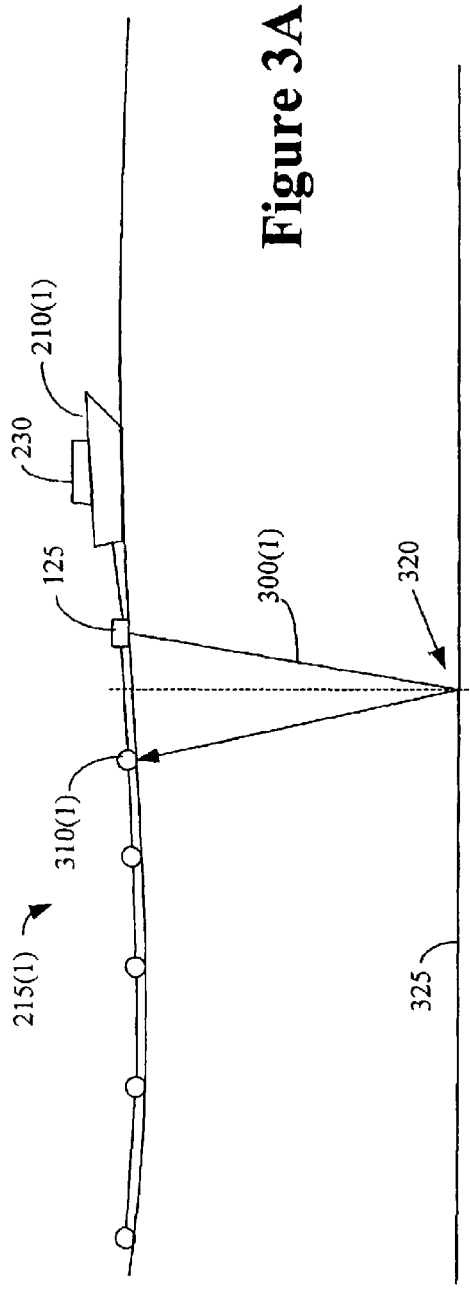
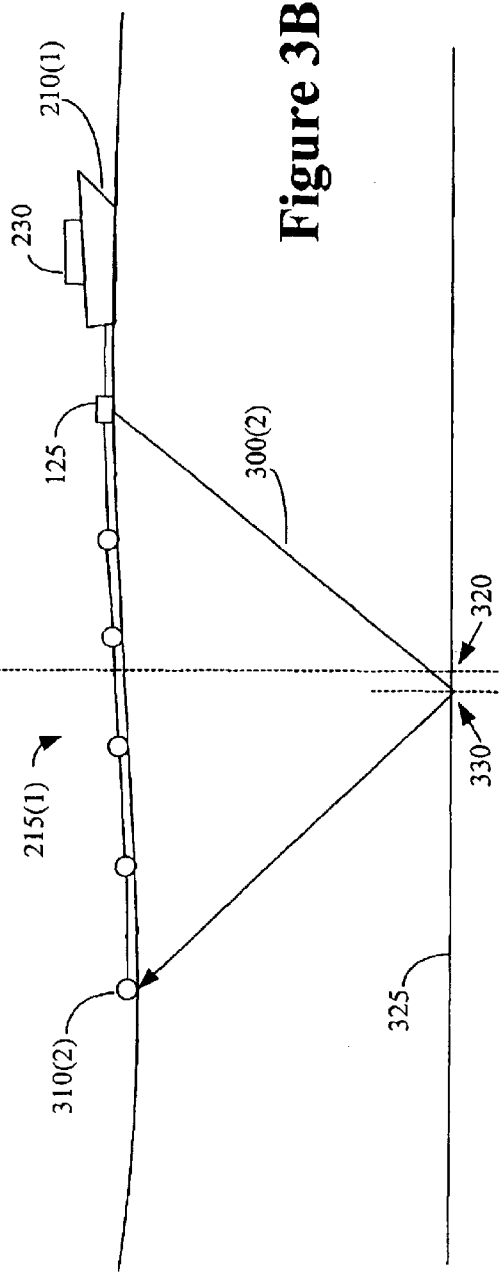

METHOD AND APPARATUS FOR ESTIMATING WATER BOTTOM REFLECTION TIME DIFFERENCE

BACKGROUND OF THE INVENTION

1. Field of the Invention

This invention relates generally to marine seismic surveying, and, more particularly, to estimating water bottom time differences in marine seismic surveying.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey conceptually illustrated in FIG. 1, an array 100 of marine seismic streamer cables 105 is towed behind a survey vessel 10 over a survey area 115. The seismic streamer cables 105 may be several thousand meters long and contain a large number of sensors 125, such as hydrophones and associated electronic equipment, which are distributed along the length of the each seismic streamer cable 105. The survey vessel 110 also tows one or more seismic sources 120, such as airguns and the like.

As the array 100 is towed over the survey area 115, acoustic signals, or "shots," produced by the seismic sources 120 are directed down through the water into the earth beneath (not shown), where they are reflected from the various subterranean geological formations. The reflected signals are received by the sensors 125 in the seismic streamer cables 105, digitized and then transmitted to the survey vessel 110. The digitized signals are referred to as "traces" and are recorded and at least partially processed at the survey vessel 110. The ultimate aim of this process is to build up a representation of the subterranean geological formations beneath the array 100. Analysis of the representation may indicate probable locations of hydrocarbon deposits in the subterranean geological formations.

Since the area of the array 100 is typically much smaller than the survey area 115, a representation of the earth strata in the survey area 115 may be formed by combining data collected along a plurality of sail lines 130(1–n). For example, a single survey vessel 110 may tow a single array 100 along each of the sail lines 130(1–n). Alternatively, a plurality of survey vessels 110 may tow a plurality of arrays 100 along a corresponding plurality of the sail lines 130 (1–n). However, variations in the water conditions, e.g. water temperature, salinity, and the like, between the plurality of sail lines 130(1–n) may cause variations in the velocity of sound in water among the sail lines 130(1–n). For example, the variations in seismic travel time can be on the order of 10 or 20 milliseconds for traces having a small distance between the source and detector for surveys carried out in deeper waters (greater than 200 m). The variations in the seismic wave travel times may shift the temporal position of the various events recorded in the seismic data, including, but not limited to, reflections and refractions of the seismic waves from the subterranean geological formations beneath the array 100. Consequently, the variations in the travel times may make it difficult to analyze the combined seismic data set and may reduce the accuracy of the survey.

Moreover, the data for the sail lines 130(1–n) may be collected at different times. For one example, a single pass along one of the sail lines 130(1–n) may take several hours to complete so, if a single survey vessel 110 is used, data for the first sail line 130(1) will be recorded at an earlier time than data for the last sail line 130(n). For another example, inclement weather and/or high seas may force a survey to be suspended before resuming hours or days later. For yet another example, historical data from previous surveys performed months or years earlier may be combined with new data to extend the survey or to fill in deficiencies in coverage that may be introduced by currents, obstacles such as platforms, and the like. And for yet another example, data from repeat surveys may be used to analyze and monitor changes in productive oil and/or gas reservoirs.

Combining data from different times, and especially from different surveys, may exacerbate the aforementioned difficulties associated with variations in the velocity of sound in the water layer. For example, seasonal variations of the water temperature, salinity, and the like, may cause pronounced variations in the velocity of sound in water. For another example, shifts in water currents may cause unpredictable variations in the velocity of sound in water, particularly for surveys carried out near the edge of strong water currents.

The seismic data is commonly corrected for the variations in the velocity of sound in water by computing one or more so-called "delta t" ($\Delta t$) values, which are typically defined as a difference between an expected travel time, usually based on an assumed ideal water velocity, and a measured travel time for one or more seismic signals. For example, the assumed ideal water velocity may be a constant velocity or one with very smooth spatial changes in velocity.

In one conventional method of determining the delta-t values (described in Wombell, R., 1996, "Water velocity variations in 3-D seismic processing," 66th Ann. Internat. Mtg: Society of Exploration Geophysicists, Expanded Abstracts, 1666–1669.), normal move-out stacking velocities and zero-offset water bottom times are computed along adjacent sail lines. The velocities are then converted to zero offset travel time differences using the formula: $\Delta t = T_w (\Delta V_w / V_w)$, where $\Delta t$ is the difference in two-way travel time at zero offset due to the change in water velocity, $T_w$ is the zero offset water bottom time, $V_w$ is the reference water velocity chosen by the practitioner, and $\Delta V_w$ is the difference between $V_w$ and the computed stacking velocity. The delta-t values are then applied to normal move-out corrected seismic data. One problem with this method is that the velocity analysis must be extremely accurate. Another issue is the effect of water bottom structure on the velocity analysis. If the dip of the water bottom (the angle the water bottom makes with a horizontal plane) changes between or along sail lines, the calculated velocities are strongly affected and may reduce the accuracy of the $\Delta t$ calculation.

Another method of determining the delta-t values that may be used to form combined data sets is described in Fried, J., and MacKay, S., 2001, "Dynamic Corrections for Water Velocity Variations: a Nova Scotia case history," Canadian Society of Exploration Geophysicists, October 2001 technical luncheon. In this method, normal move-out corrections are applied to pick times with a single velocity. The corrected pick times are then averaged for each combination of sail line, cross line, and common midpoint. The differences between sail line-cross line groups having overlapping midpoints are then evaluated and reduced using an iterative method. The method produces delta-t values that are used to apply a dynamic correction to the seismic data. One difficulty with this method is that the averaged pick times are affected by the difference between the actual normal move-out and the approximate normal move-out applied to correct the pick times. The effect of these differences propagates into the delta-t values. Reducing the offset range of pick times used in the average reduces the differences between the actual normal move-out and the approximate normal move-out applied to correct the pick times. However, reducing the offset range may also reduce the amount of overlapping data upon which the method depends. Also, since the move-out is affected by the dip of the water bottom, changes in dip between sail lines can also affect the delta-t values. Furthermore, the iteration procedures used in this method are difficult to apply in practice.

SUMMARY OF THE INVENTION

In one aspect of the instant invention, a method is provided for estimating water bottom reflection time differences. The method includes selecting a plurality of trace groups, each trace having an offset from a midpoint and a water bottom reflection time. The method also includes determining a rate of change of the water bottom reflection time of each trace and generating a model water velocity and a model water bottom reflection time for each trace midpoint using a preselected function of the water bottom reflection times and the rates of change. Furthermore, the method includes generating a plurality of water bottom reflection time corrections for the traces in each trace group using a pre-selected function of the water bottom reflection times, the model water bottom reflection times, the model water velocities, and the trace offsets. In other aspects of the present invention, an article comprising one or more machine-readable storage media may contain instructions that when executed enable a computer to perform the method or, alternatively, the article may contain data and/or data structures formed by the method.

BRIEF DESCRIPTION OF THE DRAWINGS

The invention may be understood by reference to the following description taken in conjunction with the accompanying drawings, in which like reference numerals identify like elements, and in which:

FIGS. 3A and 3B conceptually illustrate a survey vessel at two locations, as well as acoustic signals generated by the survey vessel, and reflected signals received by the survey vessel;

Figure 1:
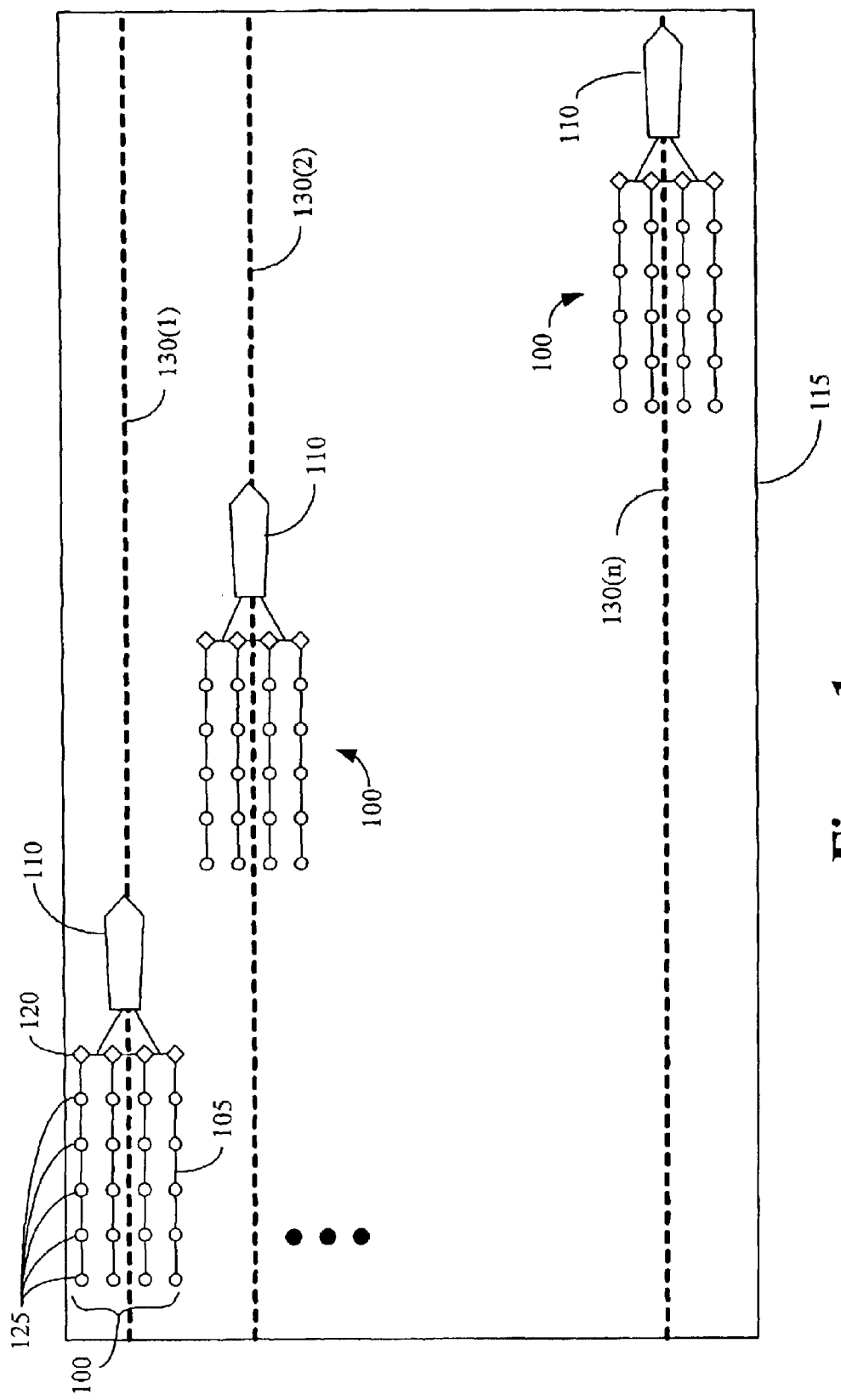
FIG. 1 conceptually illustrates an exemplary prior art marine seismic survey.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
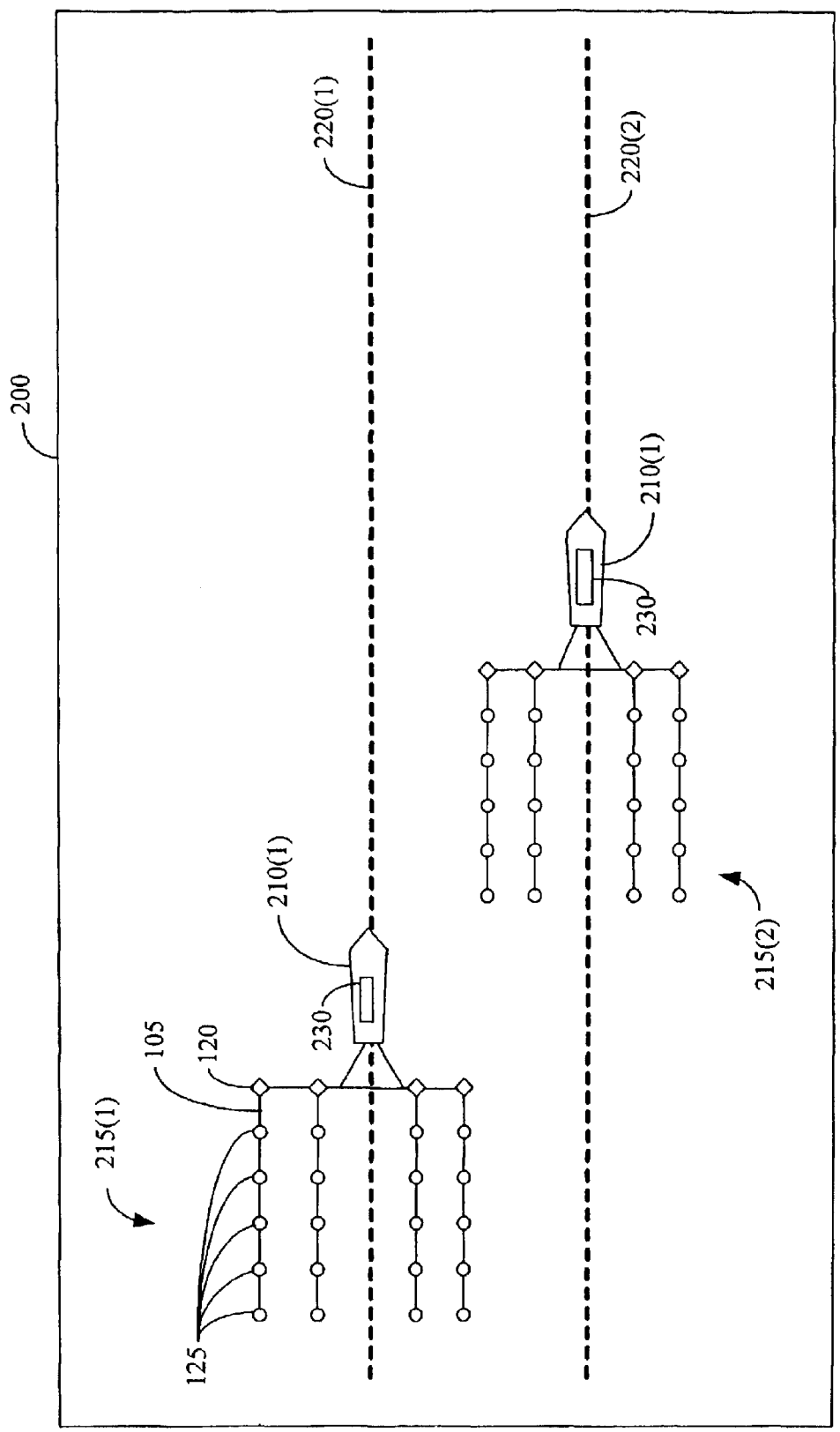
FIG. 2 conceptually illustrates two sail lines of a marine seismic survey area.

FIG. 2 conceptually illustrates a marine seismic survey area 200. To survey the marine seismic survey area 200, one or more survey vessels 210(1–2) tow one or more seismic arrays 215(1–2) over the marine seismic survey area 200. It will also be appreciated that, while the survey vessels 210(1–2) typically operate on the surface of the sea, the marine seismic survey area 200 refers to a portion of the sea bed. Furthermore, the present invention is not limited to undersea exploration, and may also be applied to surveys undertaken in freshwater, brackish water, and the like.

In the illustrated embodiment, the seismic arrays 215 (1–2) include a plurality of seismic sources 120 and seismic sensors 125, such as hydrophones, geophones, and the like, which may be coupled to the survey vessel 210(1–2) by cables 105. The plurality of seismic sources 120 and seismic sensors 125 may communicate with a signal processing unit 230 deployed on the survey vessels 210(1–2). In one embodiment, the plurality of seismic sources 120 and seismic sensors 125 may communicate with the signal processing unit 230 via the cables 105. For example, the cables 105 may include wires, fiber-optic cables, and the like that may allow the seismic sources 120 and the seismic sensors 125 to signal processing unit 230 to exchange signals.

However, the seismic sensors 125 and seismic sources 120 may not always be deployed as a part of the seismic arrays 215(1–2). In some alternative embodiments, the seismic sensors 125 can be deployed on the ocean bottom instead of being towed behind the survey vessels 210(1–2). For example, the seismic sensors 125 may be deployed on one or more ocean-bottom cables ("OBC"). The OBCs may be deployed on the seafloor so that the seismic sensors 125 may record and relay data to the signal processing units 230 on the seismic survey vessels 210(1–2). Furthermore, in one alternative embodiment, the seismic sources 120 may be deployed on buoys (not shown). In another alternative embodiment, the seismic sources 120 may be towed by a second vessel (not shown).

The survey vessels 210(1–2) tow the seismic arrays along a plurality of sail lines, such as the two sail lines 220(1–2). Although only two sail lines 220(1–2) are shown in FIG. 2A, persons of ordinary skill in the art will appreciate that surveying the marine seismic survey area 200 typically requires more than two sail lines 220(1–2). For example, a survey covering an area of 40×70 miles requires about 160 sail lines 220(1–2), with each sail line 220(1–2) capturing about 1300 feet of subsurface coverage perpendicular to the direction of boat travel. Furthermore, although the two sail lines 220(1–2) shown in FIG. 2A are depicted as being approximately adjacent, those of ordinary skill in the art will appreciate that this is not necessary for the practice of the present invention. In one embodiment, the two sail lines 220(1–2) may not be adjacent or, alternatively, the two sail lines 220(1–2) may overlap.

FIGS. 3A and 3B conceptually illustrate a side view of the survey vessel 210(1) and a portion of the seismic array 215(1) at two different locations. In operation, the seismic source 125 shown in FIG. 3A provides an acoustic signal 300(1) that propagates to a seismic sensor 310(1) through a reflection point 320 located on a sea floor 325 between the seismic source 125 and the seismic sensor 310(1). Similarly, the seismic source 125 provides an acoustic signal 300(2) that propagates to a seismic sensor 310(2) through a reflection point 330, as shown in FIG. 3B. In the illustrated embodiment, the sea floor 325 is flat and so the reflection points 320, 330 are half-way between the seismic source 125 and the seismic sensors 3110(1–2). However, those of ordinary skill in the art will appreciate that the reflection points 320, 330 may not necessarily be located half-way between the seismic source 125 and the seismic sensors 310(1–2). For example, a dipping sea floor 325 may change the location of the reflection points 320, 330.

In one embodiment, signals are generated by the seismic sensors 310(1–2) in response to receiving the reflected and/or refracted acoustic signals 300(1–2) and then the generated signals are transmitted to the signal processing unit 230 on the survey vessel 210(1–2). In the illustrated embodiment, the signal processing unit 230 uses the transmitted signals to form one or more traces representative of the reflected and/or refracted acoustic signals 300(1–2), in a manner well known in the art. The signals and/or the traces may be stored on any storage medium, including, but not limited to, recording tape, magnetic disks, compact disks, and DVDs. Some embodiments may also, in addition to or in lieu of storing the signals and/or the traces, transmit them to an on-shore facility. This may be done, for example, over a satellite link.

Figure 4:
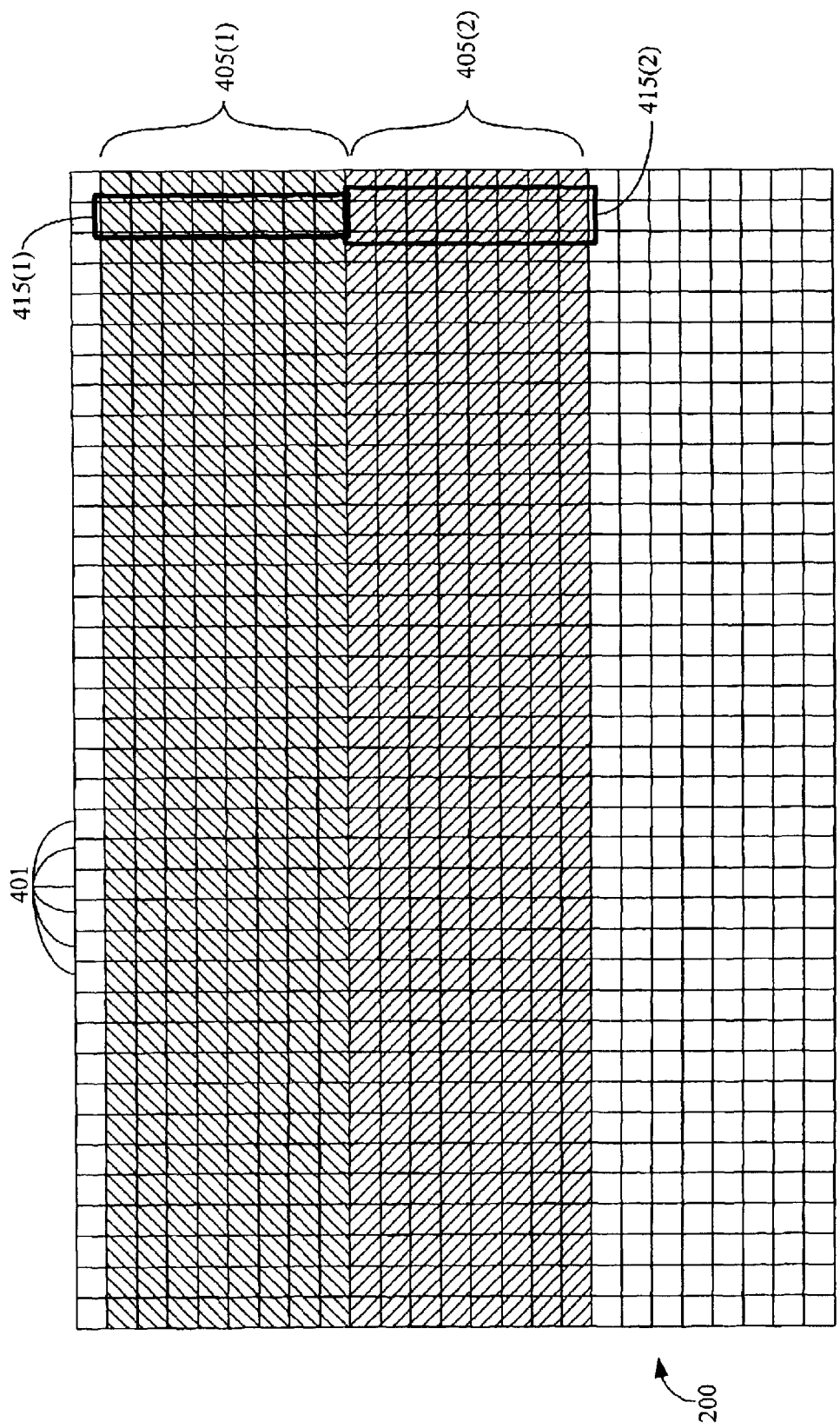
FIG. 4 conceptually illustrates a plurality of midpoint cells in the marine seismic survey area shown in FIG. 2.

The traces may be grouped according to the location of the reflection points 320, 330. For example, in the embodiment illustrated in FIG. 4, the marine seismic survey area 200 is divided into a plurality of midpoint cells 401. The signals provided by the seismic array 215(1) (not shown in FIG. 4) during a single pass over the marine seismic survey area 200 have reflection points 320 that are distributed in a band 405(1) of midpoint cells 401. Similarly, the signals provided by the seismic array 215(2) (not shown in FIG. 4) during a single pass over the marine seismic survey area 200 may have reflection points 330 that are distributed in a band 405(2) of midpoint cells 401. Although the bands 415 (1–2) shown in FIG. 4 are depicted as adjacent, this is not necessary for the practice of the present invention, as discussed above.

Traces having a common midpoint cell 401 may be combined into a single data set, a process known in the art as bringing the traces to a common midpoint, forming a common midpoint gather, and the like. Furthermore, the midpoint cells 401 may be combined into cross-line groups 415(1–2). In one embodiment, traces corresponding to the midpoint cells 401 in the cross-line group 415(1) may then be combined to form a first sail-line/cross-line gather. Similarly, traces corresponding to the midpoint cells 401 in the cross-line group 415(2) may then be combined to form a second sail-line/cross-line gather. In one embodiment, traces associated with different sail lines 220(1–2) may also be combined. For example, the traces corresponding to the midpoint cells 401 in the cross-line groups 415 (1–2) may all be combined to form a cross-line gather.

The gathered traces may then be stacked to form a representation of various structures (not shown) within and/or above the seabed in the subsurface marine seismic survey area 200, in a manner well known to those of ordinary skill in the art. However, as discussed above, variations in the water conditions, e.g. water temperature, salinity, and the like, may cause variations in the velocity of sound in water among the traces in the combined data sets. In accordance with common usage in the art, the velocity of sound in water will hereinafter be referred to as the "water speed" or the "water velocity." Variations in the water velocity among the traces in a combined data set, or gather, may make it difficult to analyze the combined data sets and may reduce the accuracy of the survey.

Figure 5:
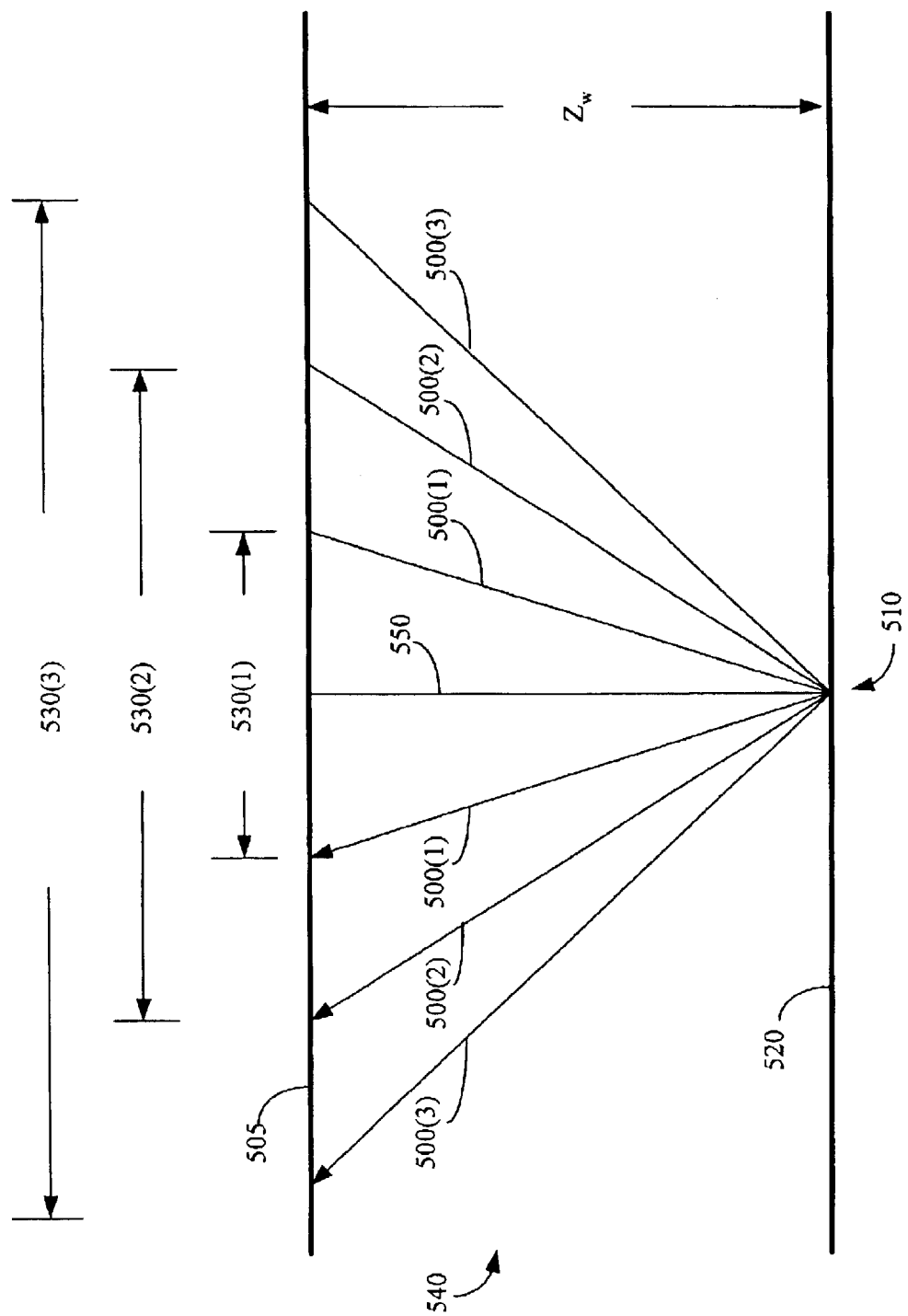
FIG. 5 conceptually illustrates a plurality of signal paths from a surface through a midpoint on a sea floor and back to the surface.

FIG. 5 conceptually illustrates a plurality of signal paths 500(1–3) from a surface 505 through a common midpoint cell 510 at a sea floor 520 and back to the surface 505. Each signal path 500(1–3) has a corresponding offset 530(1–3), which represents a horizontal separation of the seismic source and seismic sensor. Thus, for a water layer 540 having a depth Z, and a velocity of sound in water, or a water velocity, of $V_w$, an acoustic signal that propagates along the signal paths 500(1–3) has a corresponding travel time $T_{1-3}$ given by the formula $T_{1-3}=(T_0^2+X_{1-3}^2/V_w^2)^{1/2}$, where $X_{1-3}$ is the length of the corresponding offset 530(1–3) and $T_0=2Z_w/V_w$ is the vertical two-way travel time, i.e. the travel time of an acoustic signal propagating along the line 550. The vertical two-way travel time is also referred to hereinafter as the zero-offset travel time.

When combining traces formed from signals that propagate along the signal paths 500(1–3), it is conventional to apply a so-called normal move-out (NMO) correction to the traces. The NMO correction includes transforming a time coordinate of the traces using the equation $T_{0,1-3}=(T_{1-3}^2-X_{1-3}^2/V_w^2)^2$. If the water velocity $V_w$ is the same for all the traces, then the NMO-corrected travel times $T_{0/1-3}$ are all equal to a zero-offset travel time $T_0$. Grouping and/or combining the NMO-corrected traces often improves the representation of the marine seismic survey area 200 by, e.g., increasing the signal-to-noise ratio of the data. However, as discussed above, variations in the water conditions, e.g. water temperature, salinity, and the like, between the plurality of sail lines 200(1–2) may cause sail-line-to-sail-line variations in the water velocity, such that the NMO-corrected travel times $T_{0,1-3}$ are different for different traces.

Figure 6:
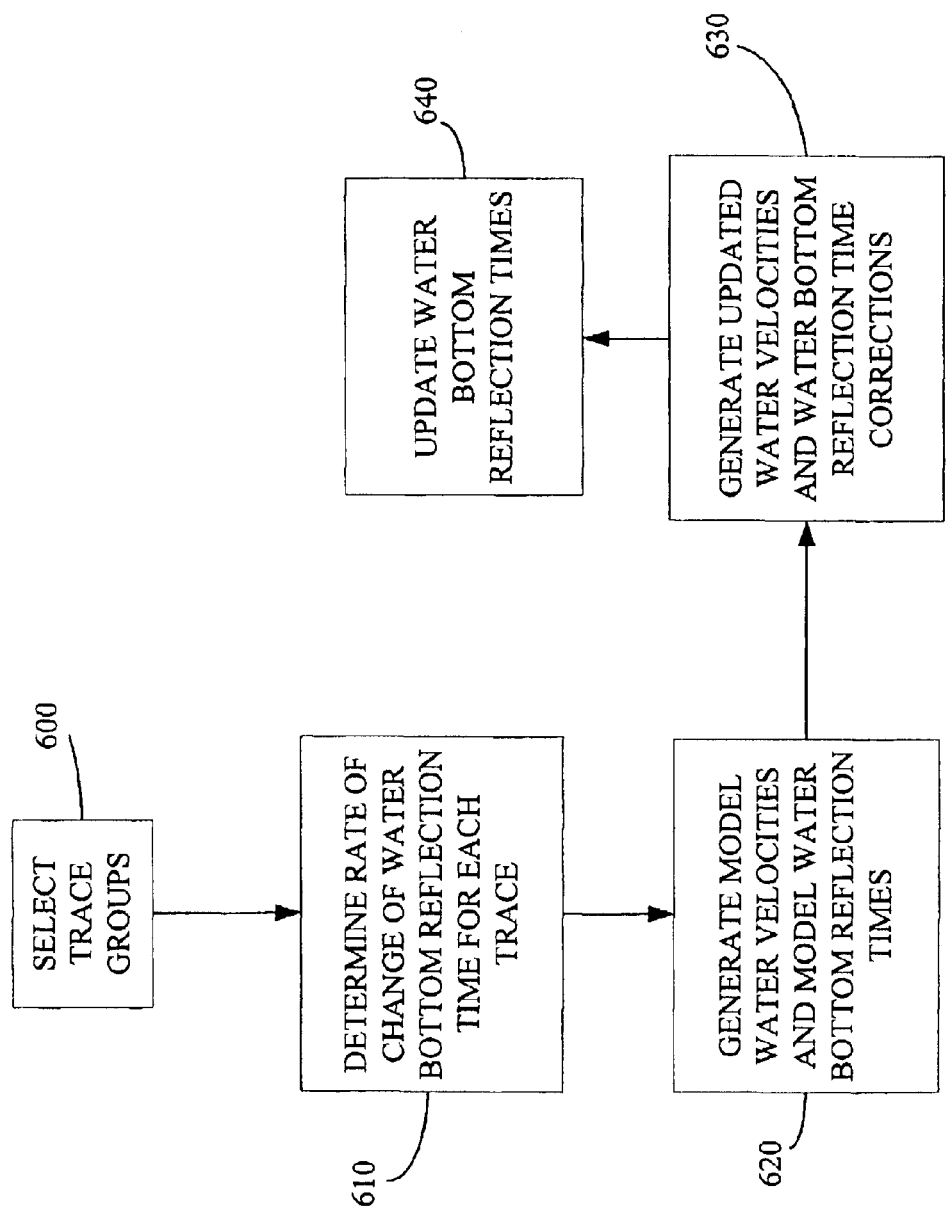
FIG. 6 conceptually illustrates a method for analyzing traces collected along a plurality of sail lines, such as the sail lines shown in FIG. 2.

FIG. 6 conceptually illustrates a method for analyzing traces collected along a plurality of sail lines (e.g., the sail lines 220(1–2) shown in FIG. 2) in a marine seismic survey area 200. Groups of traces are selected (at 600). In one embodiment, selecting (at 600) the trace groups includes gathering traces having a common midpoint cell 410 in a common cross-line group 415(1–2), as discussed above. However, in alternative embodiment, any desirable grouping of the traces may be used. For example, traces having, or expected to have, a common water velocity may be grouped together.

In the illustrated embodiment, the rate of change of the water bottom reflection time for each trace is determined (at 610). For example, the water bottom reflection time, $T_n$, may be determined by NMO-correcting pick times, T, associated with each trace, according to the formula:

$$T_n=(T^2-X^2S^2)^{1/2}, \quad (1)$$

where X is the offset of the trace and S is the inverse of the water velocity. The inverse of the water velocity is commonly referred to as the "slowness." The rate of change of the water bottom reflection time is then determined (at 610) by taking the derivative of equation (1) with respect to the slowness. Thus, in the illustrated embodiment, the rate of change of the water bottom reflection time with respect to the slowness, β, is given by the formula:

$$\beta = \delta T_n / \delta S = -X^2 S / T_n \quad (2)$$

However, it will be appreciated that the rate of change of the water bottom reflection time, β, is given in equation (2) is merely intended to be illustrative and not to limit the present invention. In alternative embodiments, other expressions for the rate of change of the water bottom reflection time, including derivatives with respect to the water velocity and the like, may be used.

Model water velocities and model water bottom reflection times are then generated (at 620). In one embodiment, the rate of change of the water bottom reflection time may be used to define a function of the NMO-corrected travel times, $T_n(i,j)$, and a plurality of model travel times, $T_0(j)$, associated with the midpoint cells, e.g., the midpoint cells 410 shown in FIG. 4. For example, the function may be a square difference between the NMO-corrected travel times, $T_n(i,j)$ and the plurality of model travel times, $T_0(j)$:

$$\epsilon^2 = (T_0(j) + \beta \Delta S(j) - T_n(i,j))^2 \quad (3)$$

In equation (3), the index "i" refers to the trace, the index "j" refers to the midpoint cell, and the rate of change of the water bottom reflection time with respect to the slowness, β, is given by equation (3). The model water velocity is included in equation (3) via the model slowness, ΔS(jj) for the midpoint cell indicated by the index "j".

In some alternative embodiments, a spatially smooth model water velocity is computed. For example, the model slowness, ΔS(j), may be an average taken over adjacent midpoint cells. In one embodiment, the average may be a 3-cell average in which ΔS(j) is replaced with ΔS(jj), where the index jj indicates the group of three cells, j−1, j, j+1. Alternatively, a weighted average based on the number of traces falling in cells j−1, j, j+1, could be taken. In yet another alternative embodiment, ΔS(j) may be averaged and/or smoothed after performing the minimization.

The model water velocities and model water bottom reflection times may be generated (at 620) by minimizing the squared difference given by equation (3) using, e.g. a least-squares solution such as a Gauss-Seidel method or a conjugate gradient method. Although not necessary for the practice of the present invention, in various alternative embodiments, the above process may be iterated to generate iteratively updated model water velocities and iteratively updated model water bottom reflection times.

The model water velocities extracted during the above-described velocity analysis may be affected by dip of the water bottom and the orientation of the line connecting the source and detector (or source-detector azimuth), as will be appreciated by those of ordinary skill in the art. Thus, in alternative embodiments, the pick times may be normalized using the azimuth and an approximate dip field measured from common midpoint stacks of the water bottom. However, normalizing the pick times is not necessary for the practice of the present invention and may be omitted. Moreover, those of ordinary skill in the art will appreciate that, in alternative embodiments, other selected portions of the seismic data and/or alternative techniques may also be used to generate (at 620) the model water velocity and/or the model water bottom reflection times. The alternative techniques include, but are not limited to, other averaging techniques, estimation procedures, direct measurements, and the like. These techniques may be applied to the pick times and/or the other selected portions of the seismic data.

One or more reflection times, such as the zero-offset reflection times, $T_0(j)$, and one or more water bottom reflection time corrections, such as the zero-offset water bottom reflection time corrections, $\Delta t_0(k)$, are then generated (at 630). In one embodiment, generating (at 630) the zero-offset reflection times and zero-offset water bottom reflection time corrections includes determining NMO-corrected travel times $T_n(i,j,k)$ by NMO-correcting the pick times $T(i,j,k)$ using the model water velocities, represented here by the slowness $S(j)$, determined in the aforementioned velocity analysis and the equation:

$$T_n(i,j,k) = (T(i,j,k)^2 - X(i,j,k)^2 S(j)^2)^{1/2} \quad (4)$$

The index "k" in equation (4) refers to the selected group. In one embodiment, the NMO-corrected travel times $T_n(i,j,k)$ are modeled as a linear combination of zero-offset travel times $T_0(j)$ and a plurality of zero-offset time corrections $\Delta t_0(k)$, as in the equation:

$$T_n(i,j,k) = T_0(j) + \alpha(i,j,k) \Delta t_0(k) \quad (5)$$

where $\alpha(i,j,k)$ is a function that relates zero-offset time corrections to non-zero offset time corrections. In one embodiment, $\alpha(i,j,k)$, is given approximately by the equation:

$$\alpha(i,j,k) \approx 1 + (X(i,j,k) S(j) / T_n(i,j,k))^2. \quad (6)$$

However, it will be appreciated by those of ordinary skill in the art that the functional definition of $\alpha(i,j,k)$ is a matter of design choice and not material to the present invention.

Equation (5) may then be solved for the updated zero-offset travel times $T_0(j)$ and a plurality of zero-offset time corrections $\Delta t_0(k,k)$ using a variety of techniques well known to those of ordinary skill in the art. For example, equation (5) the solved by minimizing $\epsilon^2$ in the equation:

$$\epsilon^2 = (T_n(i,j,k) - T_0(j) + \alpha(i,j,k) \Delta t_0(k))^2. \quad (7)$$

The least-squares error function defined in equation (7) may be solved for the zero-offset travel time corrections $\Delta t_0(k)$ that minimize the error using a Gauss-Seidel method. However, those of ordinary skill in the art will appreciate that equations (7) may be solved by a variety of techniques. For example, in one alternative embodiment, equation (7) may be solved using a conjugate gradient method. In one other alternative embodiment, additional constraints may be added to equation (7) to facilitate a solution. In yet another alternative embodiment, iterations of the minimization of equation (7) may be performed using updated values of $T_n$ and α computed from the $T_n$ and a sum of the $\Delta t_0(k)$ of the previous "m" iterations:

$$T_n(i,j,k,m+1) = T_n(i,j,k,0) + \Sigma \Delta t_0(k,m) \quad (8)$$

until a selected convergence criterion is reached. For example, the minimizations may be iterated until the changes in the water bottom correction times $\Delta t_0(km)$ change in absolute value by less than 1 percent of the absolute value of the values from the first iteration, $\Delta t_0(k,0)$.

The water bottom times and water bottom reflection time corrections ($T_0(j)$ and $\Delta t_0(k)$, respectively) are then used to update (at 640) the water bottom reflection times. For example, in one embodiment, the water bottom reflection times may be updated (at 640) using a dynamic correction procedure, known to those of ordinary skill in the art. However, in alternative embodiments, any desirable procedure for updating (at 640) the water bottom reflection times may be used.

Figure 7A:
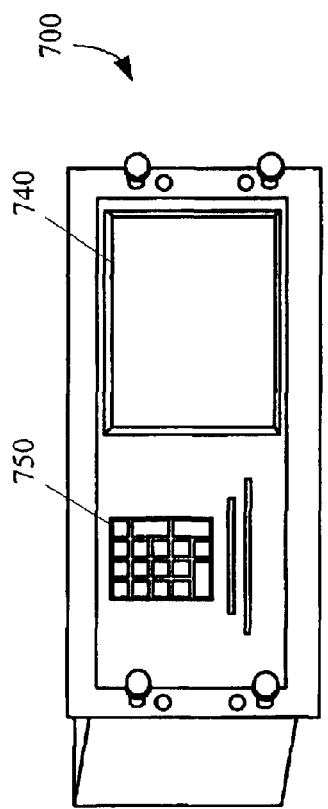
FIGS. 7A and 7B conceptually illustrate aspects of a computing apparatus that may be used to implement the method shown in FIG. 6.
Figure 7B:
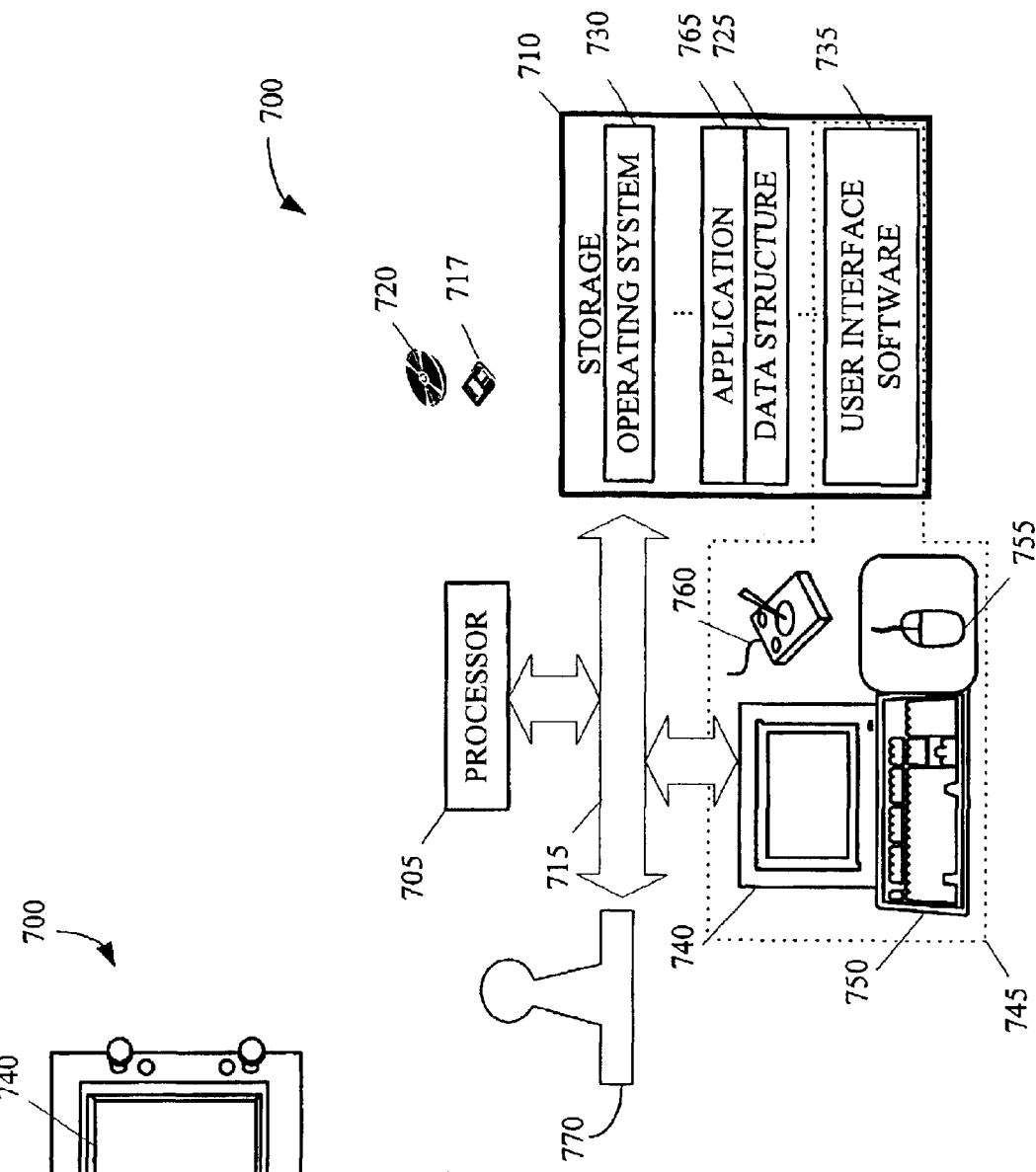

FIGS. 7A and 7B show a computing apparatus 700 that may be used to perform the aforementioned operations. The computing apparatus 700 includes a processor 705 communicating with some storage 710 over a bus system 715. The storage 710 may include a hard disk and/or random access memory ("RAM") and/or removable storage such as a floppy magnetic disk 717 and an optical disk 720. The storage 710 is encoded with a data structure 725 storing the signals collected as discussed above, an operating system 730, user interface software 735, and an application 765. The user interface software 735, in conjunction with a display 740, implements a user interface 745. The user interface 745 may include peripheral I/O devices such as a key pad or keyboard 750, a mouse 755, or a joystick 760. The processor 705 runs under the control of the operating system 730, which may be practically any operating system known to the art. The application 765 is invoked by the operating system 730 upon power up, reset, or both, depending on the implementation of the operating system 730.

As discussed above, data collected during the marine seismic survey may be communicated to the computing apparatus 700 via any storage medium, including, but not limited to, recording tape, magnetic disks, compact disks, and DVDs. The data collected during the marine seismic survey may also be communicated directly to the computing apparatus 700 by, e.g., a satellite link 770, and stored in the storage 710. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of analyzing traces collected along a plurality of sail lines in a marine seismic survey area, comprising:
   selecting a plurality of trace groups, each trace having an offset from a midpoint and a water bottom reflection time;
   determining a rate of change of the water bottom reflection time of each trace;
   generating a model water velocity and a model water bottom reflection time for each trace midpoint using a preselected function of the water bottom reflection times and the rates of change; and
   generating a plurality of water bottom reflection time corrections for each trace group using a pre-selected function of the water bottom reflection times, the model water bottom reflection times, the model water velocities, and the trace offsets.

2. The method of claim 1, wherein selecting the plurality of trace groups comprises selecting a plurality of trace groups expected to have approximately a common water velocity.

3. The method of claim 1, wherein selecting the plurality of trace groups comprises selecting a plurality of trace groups having a common cross-line group.

4. The method of claim 1, wherein determining the rate of change of the water bottom reflection time of each trace comprises determining the rate of change of the water bottom reflection time of each trace using the trace offset, the trace water bottom reflection time, and an estimated water velocity associated with the trace midpoint.

5. The method of claim 1, wherein determining the rate of change of the water bottom reflection time of each trace comprises determining the rate of change the water bottom reflection time of each trace with respect to the water velocity.

6. The method of claim 1, wherein determining the rate of change of the water bottom reflection time of each trace comprises determining the rate of change of the water bottom reflection time of each trace using an approximate analytic expression for the rate of change.

7. The method of claim 1, wherein generating the model water velocity and the model water bottom reflection time for each trace midpoint using the preselected function of the water bottom reflection times, the estimated water velocities, and the rates of change comprises minimizing a least-squares function of the water bottom reflection times, the estimated water velocities, and the rates of change.

8. The method of claim 1, wherein generating the plurality of water bottom reflection time corrections for the trace groups using the pre-selected function comprises generating the plurality of water bottom reflection time corrections for the trace groups using a least-squares error function.

9. The method of claim 8, wherein generating the plurality of water bottom reflection time corrections for the trace groups using the least-squares error function comprises minimizing the least-squares error function.

10. The method of claim 8, wherein minimizing the least-squares error function comprises minimizing the least-squares error function using at least one of a Gauss-Seidel method and a conjugate gradient method.

11. The method of claim 1, wherein generating the plurality of water bottom reflection time corrections comprises determining a plurality of zero-offset water bottom reflection time corrections, each zero-offset water bottom reflection time correction being associated with one of the trace groups.

12. The method of claim 1, wherein generating the plurality of model water bottom reflection times comprises generating a plurality of zero-offset model water bottom reflection times.

13. The method of claim 1, further comprising forming a plurality of updated water bottom reflection times using the plurality of water bottom reflection time corrections and the plurality of model water bottom reflection times.

14. The method of claim 13, further comprising generating a plurality of new water bottom reflection time corrections using the pre-selected function of the water bottom reflection times, the updated water bottom reflection times, and the trace offsets.

15. The method of claim 13, wherein forming the updated water bottom reflection times comprises forming a plurality of updated zero-offset water bottom reflection times.

16. An article comprising one or more machine-readable storage media containing instructions that when executed enable a computer to:
select a plurality of trace groups from traces collected along a plurality of sail lines in a marine seismic survey area, each trace having an offset from a midpoint and a water bottom reflection time;
determine a rate of change of the water bottom reflection time of each trace using the trace offset, the trace water bottom reflection time, and an estimated water velocity associated with the trace midpoint, the rate of change being taken with respect to the water velocity;
generate a model water velocity and a model water bottom reflection time for each trace midpoint using a preselected function of the water bottom reflection times, the estimated water velocities, and the rates of change; and
generate a plurality of water bottom reflection time corrections for each trace group using a pre-selected function of the water bottom reflection times, the model water bottom reflection times, the model water velocities, and the trace offsets.

17. The article of claim 16, wherein the one or more machine-readable storage media contain instructions that when executed enable the computer to determine the rate of change of the water bottom reflection time of each trace using an approximate analytic expression for the rate of change.

18. The article of claim 16, wherein the one or more machine-readable storage media contain instructions that when executed enable the computer to generate the model water velocity and the model water bottom reflection time for each trace midpoint by minimizing a least-squares function of the rate of change, the water bottom reflection time, and the estimated water velocity.

19. The article of claim 16, wherein the one or more machine-readable storage media contain instructions that when executed enable the computer to generate the plurality of water bottom reflection time corrections for the trace groups using a least-squares error function.

20. The article of claim 19, wherein the one or more machine-readable storage media contain instructions that when executed enable the computer to generate the plurality of water bottom reflection time corrections for the trace groups by minimizing the least-squares error function using at least one of a Gauss-Seidel method and a conjugate gradient method.

21. The method of claim 16, wherein the one or more machine-readable storage media contain instructions that when executed further enable the computer to form a plurality of updated water bottom reflection times using the plurality of water bottom reflection time corrections and the plurality of model water bottom reflection times.

22. The method of claim 21, wherein the one or more machine-readable storage media contain instructions that when executed further enable the computer to generate a plurality of new water bottom reflection time corrections for each of the traces in the trace groups using the pre-selected function of the model water bottom reflection times, the updated water bottom reflection times, and the offset.

23. The method of claim 16, wherein generating a plurality of water bottom reflection time corrections comprises generating a plurality of zero-offset water bottom reflection time corrections.

24. An article comprising one or more machine-readable storage media containing data structures and data formed by:
selecting a plurality of trace groups from traces collected along a plurality of sail lines in a marine seismic survey area, each trace having an offset from a midpoint and a water bottom reflection time;
determining a rate of change of the water bottom reflection time of each trace using the trace offset, the trace water bottom reflection time, and an estimated water velocity associated with the trace midpoint, the rate of change being taken with respect to the water velocity;
generating a model water velocity and a model water bottom reflection time for each trace midpoint using a preselected function of the water bottom reflection times, the estimated water velocities, and the rates of change; and
generating a plurality of water bottom reflection time corrections for each trace group using a pre-selected function of the water bottom reflection times, the model water bottom reflection times, the model water velocities, and the trace offsets.

25. The article of claim 24, wherein determining the rate of change of the water bottom reflection time of each trace comprises determining the rate of change of the water bottom reflection time using an approximate analytic expression for the rate of change.

26. The article of claim 24, wherein generating the plurality of water bottom reflection time corrections for the trace groups comprises the plurality of water bottom reflection time corrections for the trace groups using a least-squares error function.

27. The article of claim 26, wherein generating the plurality of water bottom reflection time corrections for the trace groups comprises minimizing the least-squares error function using at least one of a Gauss-Seidel method and a conjugate gradient method.

28. The article of claim 24, wherein the data structures and data are further formed by updating the water bottom reflection times using the plurality of water bottom reflection time corrections for each trace group to the traces in each group.

29. The article of claim 28, wherein the data structures and data are further formed by generating a plurality of new water bottom reflection time corrections for each of the traces in the trace groups using the pre-selected function of the water bottom reflection times, the updated water bottom reflection times, and the offsets.

30. The article of claim 24, wherein generating the plurality of water bottom reflection time corrections comprises generating a plurality of zero-offset water bottom reflection time corrections.

* * * * *